(12) United States Patent
Pronkine

(10) Patent No.: US 6,496,231 B1
(45) Date of Patent: Dec. 17, 2002

(54) METHOD AND APPARATUS FOR CORRECTING CONVERGENCE AND GEOMETRY ERRORS IN DISPLAY DEVICES

(75) Inventor: Viatcheslav Pronkine, Lake Hiawatha, NJ (US)

(73) Assignee: Koninklijke Philips Electronics N.V., Eindhoven (NL)

(*) Notice: Subject to any disclaimer, the term of this patent is extended or adjusted under 35 U.S.C. 154(b) by 0 days.

(21) Appl. No.: 09/343,907

(22) Filed: Jun. 30, 1999

(51) Int. Cl.[7] .............................. H04N 3/22; H04N 3/23
(52) U.S. Cl. ................... 348/745; 348/746; 315/368.12
(58) Field of Search .................... 348/745–747, 348/806, 807, 190, 191; 315/368.11, 368.12; H04N 3/22, 3/23, 3/26

(56) References Cited

U.S. PATENT DOCUMENTS

| | | | |
|---|---|---|---|
| 4,689,526 A | * 8/1987 | Schweer ..................... | 315/371 |
| 5,532,764 A | 7/1996 | Itaki ........................... | 348/745 |
| 5,576,774 A | 11/1996 | Hosoi et al. ................ | 348/745 |
| 5,764,311 A | 6/1998 | Bonde et al. ............... | 348/746 |
| 5,939,843 A | * 8/1999 | Kimoto et al. ............. | 315/11.5 |
| 6,002,454 A | * 12/1999 | Kajiwara et al. .......... | 315/368.18 |

FOREIGN PATENT DOCUMENTS

| | | | | |
|---|---|---|---|---|
| JP | 55-163986 | 12/1980 | | |
| JP | 62-234488 | 10/1987 | | |
| JP | 63-3591 | 1/1988 | | |
| JP | 04253490 A | * 9/1992 | ............ | H04N/9/28 |
| JP | 5-284511 | 10/1993 | | |
| JP | 5-328370 | 12/1993 | | |
| JP | 07264608 A | * 10/1995 | ............ | H04N/9/28 |

\* cited by examiner

*Primary Examiner*—Michael Lee

(57) ABSTRACT

An apparatus for correcting convergence and geometry errors in a display device re-maps the positioning of pixels in a video signal based on predetermined convergence and geometry errors in a display device. The apparatus includes counters for determining the intended horizontal and vertical positions of the pixels, a memory having stored therein the actual horizontal and vertical positions of pixels in the display device, and a frame buffer coupled to the counters and the memory for selectively delaying the pixels in the video signal, such that when outputted, the pixels form an image on the display device without the convergence and geometry errors.

8 Claims, 4 Drawing Sheets

METHOD AND APPARATUS FOR CORRECTING CONVERGENCE AND GEOMETRY ERRORS IN DISPLAY DEVICES

BACKGROUND OF THE INVENTION

1. Field of the Invention

The subject invention relates to display devices, and in particular, to projection television receivers.

2. Description of the Related Art

Projection television receivers enable the formation of large displays economically. These projection television receivers typically include three projection tubes formed by cathode ray tubes which are arranged in a horizontal plane. The images from these projection tubes are then focused to form a single image on a display screen. Typically, the center one of these three projection tubes is in registry with the screen. However, the outer two tubes form trapezoidal images on the display screen which need to be corrected such that they are in convergence with the image from the center projection tube. Furthermore, even the image from the center tube may not form a correct geometry image and, as such, needs to be corrected.

To this end, projection television receivers include convergence correction circuits in which the horizontal and vertical deflection signals to each of the three projection tubes are adjusted such that convergence and geometry errors are corrected. The adjustment of these circuits is tedious and involves an operator determining, by eye, whether the adjustments are proper.

SUMMARY OF THE INVENTION

It is an object of the present invention to provide a method and an apparatus that electronically re-maps the pixels in a video signal such that convergence and geometry errors are compensated.

It is a further object of the present invention to provide a method and an apparatus that corrects for convergence and geometry errors without, or in addition to, modifying the horizontal and vertical scanning signals.

The above objects are achieved in an apparatus for correcting convergence and geometry errors in display devices comprising an input for receiving a digital video signal; means for determining intended horizontal and a vertical addresses for each pixel in said video signal; means for generating actual addresses for each pixel corresponding to an actual horizontal and vertical location in a displayed image, said actual horizontal and vertical location being based on a particular display device; and means coupled to said input, said determining means and said generating means for storing the pixels in the digital video signal and for outputting said pixels at an appropriate time whereby errors between said intended and actual addresses are corrected.

The subject invention recognizes that certain convergence and geometry errors are inherent in, for example, projection television receivers and are repeatable unless corrected. By measuring and storing these errors, the positioning of the pixels in a video signal, i.e., the time when each pixel is outputted, may be adjusted such that in the resulting image, these errors are compensated. The apparatus applies geometric pre-distortion to a digital video signal in order to compensate for distortion in the display device.

BRIEF DESCRIPTION OF THE DRAWINGS

With the above and additional objects and advantages in mind as will hereinafter appear, the invention will be described with reference to the accompanying drawings, in which:

FIG. 1A shows a display screen with an image frame centered in the display screen, while

DESCRIPTION OF THE PREFERRED EMBODIMENTS

Figure 1A:
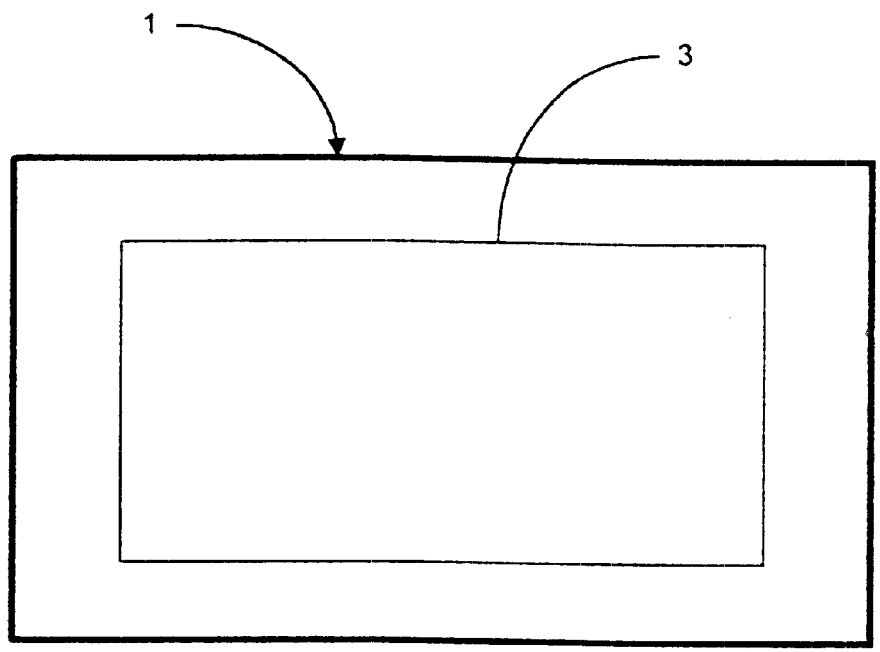
Figure 1B:
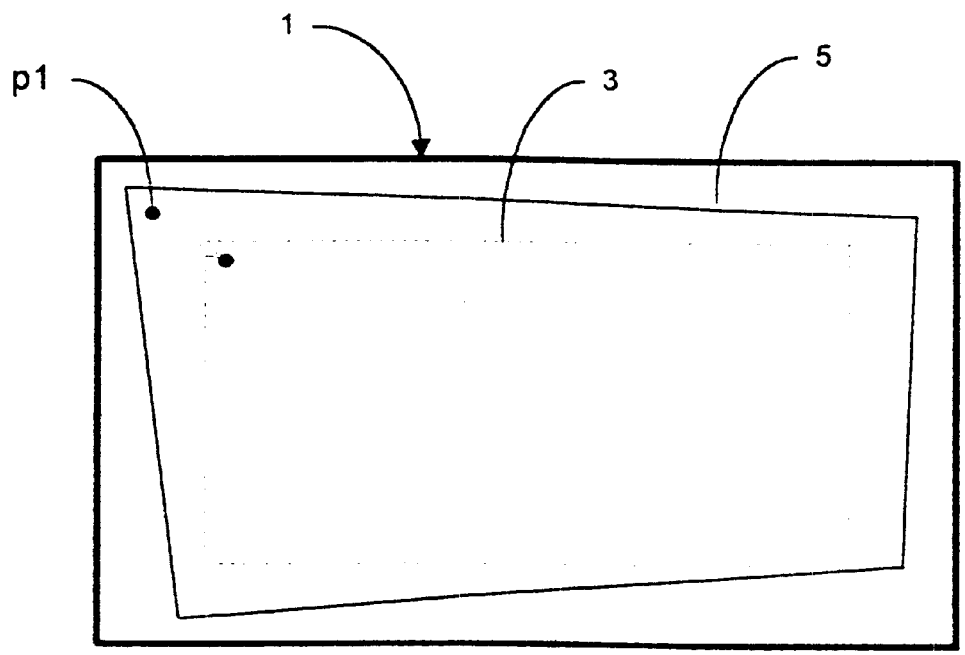
FIG. 1B shows the display screen with a skewed image frame.

FIG. 1A shows a display screen 1 of, for example, a projection television receiver. An ideal image frame 3 is shown in the display screen 1 which has the correct convergence and geometry. However, in a projection television receiver without correction, this is not the case. Rather, as shown in FIG. 1B, the trapezoidal distorted image 5 is what is actually displayed (note the ideal image frame 3 within the distorted image 5). The object of the present invention is to "pull" the pixel p1 from its current position n1,m1 to a new position n2,m2 such that it now appears within the ideal image frame 3.

Figure 2:
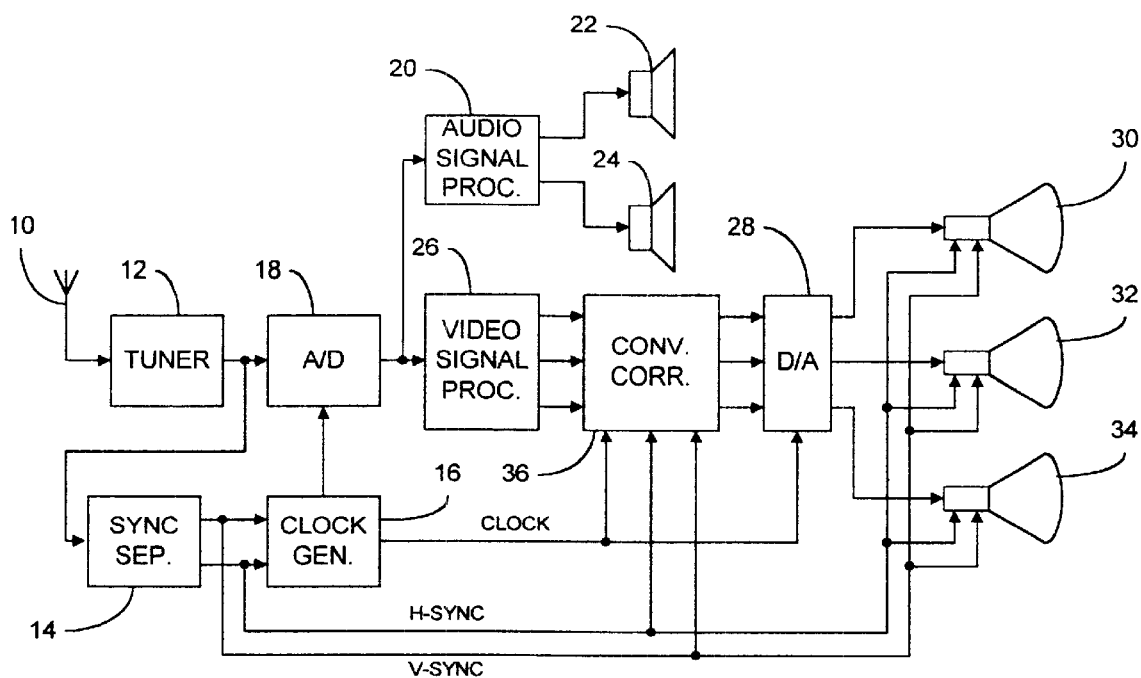
FIG. 2 shows a block diagram for a projection television receiver having the apparatus in accordance with the invention.

FIG. 2 shows a block diagram of a projection television receiver. The projection television receiver includes an antenna 10 for receiving video signals. The antenna 10 is connected to a tuner 12 for tuning to one of the video signals. An output from the tuner 12 is applied to a synchronization signal separation circuit 14 for separating the synchronizing signals from the tuned video signal. This synchronization signal separation circuit 14 outputs horizontal and vertical synchronizing signals which are applied to a clock signal generator 16 for generating a pixel clock signal. The output from the tuner 12 is also applied to an analog-to-digital (A/D) converter 18 which converts the analog video signal to a digital video signal under control of the pixel clock signal. An output from the A/D converter 18 is applied to an audio signal processing circuit 20 which detects an audio signal included in the digital video signal, appropriately processes this audio signal and provides at least, for example, a left and right channel signal to corresponding loudspeakers 22 and 24.

The output from the A/D converter 18 is additionally applied to a video signal processing circuit 26 for appropriately processing the video portion of the digital video signal (e.g., color correction, contrast, etc.). The video signal processing circuit 26 provides the three color signals red, green and blue (R, G, B) which are then normally applied to digital-to-analog (D/A) converters 28 and then to the projection tubes 30, 32 and 34. However, in the subject invention, the R, G, B signals are applied to the convergence correction circuit 36 of the subject invention, which also receives the pixel clock signal from the clock signal generator 16 and the horizontal and vertical synchronizing signals from the synchronization signal generator 16. The convergence correction circuit 36 then provides corrected R, G, B signals which are then applied to the D/A converters 28.

Figure 3:
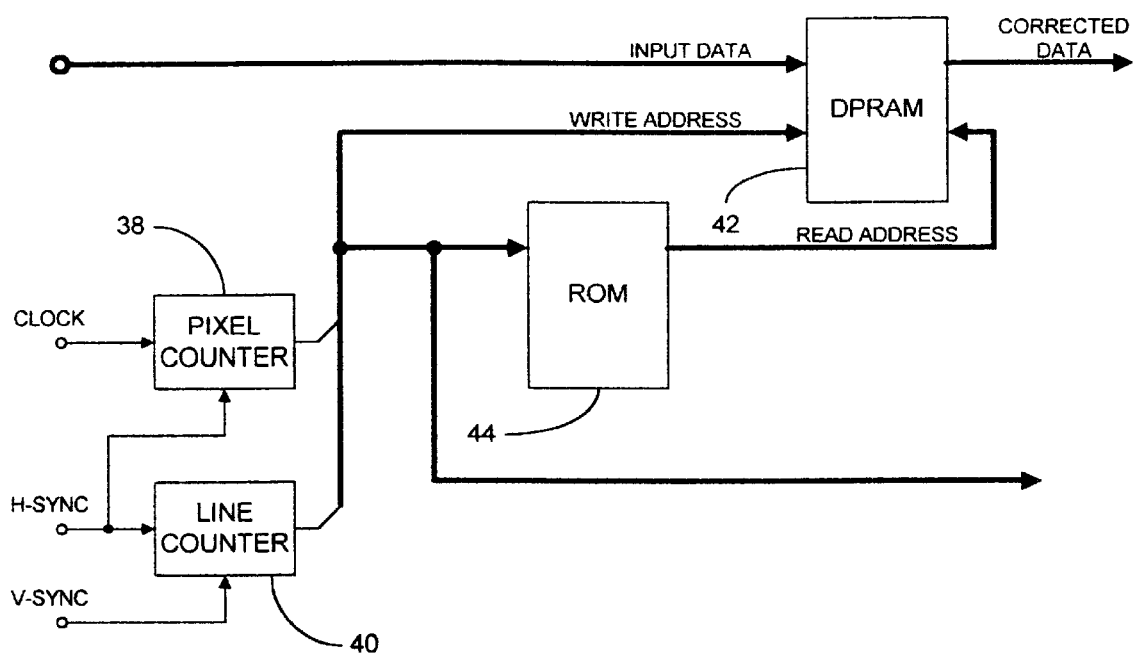
FIG. 3 shows a block diagram of an embodiment of the apparatus of the subject invention for one color signal.

FIG. 3 shows a block diagram of a portion of the convergence correction circuit 36 which is for correcting one of the color signals. It should be understood that the convergence correction circuit 36 includes duplicates of this circuit for each of the colors.

A pixel counter 38 has its count input connected to the output of the clock signal generator 16 for counting the pixels in the input color signal. A reset input of the pixel counter 38 is coupled to receive the horizontal synchronizing signal from the synchronization signal separation circuit 14. The horizontal synchronizing signal is further applied to the count input of a line counter 40 which is reset by the vertical synchronizing signal, again from the synchronization signal separation circuit 14. The output from the pixel counter 38 is the intended horizontal position of the corresponding pixel in the input color signal, while the output from the line counter 40 is the intended vertical position of the corresponding pixel in the input color signal. The outputs from the pixel and line counters 38 and 40 are applied to a write address input of a dual-port RAM (DPRAM) 42 which receives the relevant digitized color signal (pixel data) at its data (D) input. The outputs from the pixel,and line counters 38 and 40 are also applied to an input of a ROM 44 which has been programmed with the actual errors in a particular projection television receiver. The output from the ROM 44 is applied to a read address input of the DPRAM 42.

The DPRAM 42 acts as a frame buffer and stores the pixel data of the input color signal at the addresses designated by the pixel and line counters 38 and 40. The DPRAM 42 applies signals to its output corresponding to the addresses designated by the output of the ROM 44. In practice, those locations in the DPRAM 42 indicated by the output of the ROM 44 which lie outside of the correct geometry image as defined by the pixel and line counters 38 and 40 have no values stored therein and as such, no signal is applied to the output of the DPRAM 42. When the read address applied to the DPRAM 42 by the ROM 44 corresponds to one in which pixel data is stored, this data is then applied to the output of the DPRAM 44, for application to the D/A converters 28 and the appropriate projection tube 30, 32 and 34.

Figure 4:
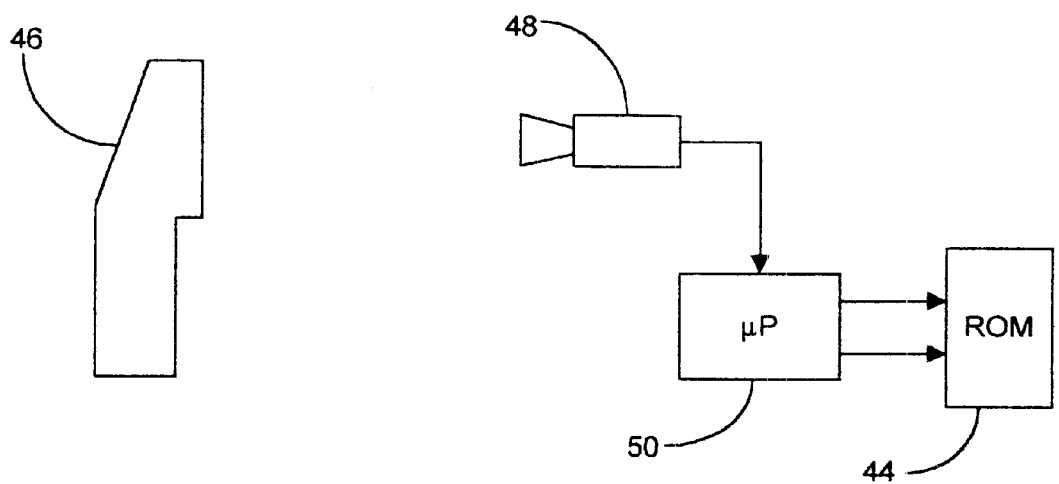
FIG. 4 shows a block diagram of an embodiment for calibrating the apparatus of the subject invention.

FIG. 4 shows a set-up for generating the data to be stored in the ROM 48. A projection television receiver 46, in which the convergence correction circuit 36 is deactivated, is energized. A digital registration camera 48 is focused on the display of the projection television receiver 46 and is connected to a microprocessor 50 which then determines the actual pixel positions of the displayed image and generates the data for storage in the ROM 44. This is performed for each of the color signals resulting in three separate ROM's 44 which are used in corresponding circuits in the convergence correction circuit 36.

Using the convergence correction circuit 36, the total geometry distortion will not exceed ½ pixel. This amount can be decreased using a DPRAM with greater resolution and a display device again with greater resolution.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. An apparatus for correcting convergence and geometry errors in display devices comprising:
   an input for receiving a digital video signal;
   means for determining write addresses corresponding to an intended horizontal and a vertical location for each pixel in said digital video signal;
   means for generating read addresses corresponding to actual horizontal and vertical locations in a displayed image, said actual horizontal and vertical locations being based on a particular display device; and
   means coupled to said input, said determining means and said generating means for storing the pixels in the digital video signal at said write addresses from said determining means, and for outputting said pixels at an appropriate time as determined by said read addresses from said generating means, whereby errors between said intended and actual addresses are corrected.

2. The apparatus for correcting convergence and geometry errors in display devices as claimed in claim 1, wherein said generating means comprises a read-only memory (ROM) having address data stored therein corresponding to an actual display image having geometry errors of said particular display device.

3. The apparatus for correcting convergence and geometry errors in display devices as claimed in claim 2, wherein said address data stored in said ROM is generated by a digital registration camera focused on the displayed image having geometry errors of the display device, and a processor for analyzing an output from the digital registration camera and generating said address data for storage in said ROM.

4. The apparatus for correcting convergence and geometry errors in display devices as claimed in claim 1, wherein said storing means comprises a dual-ported random access memory (DPRAM) having a data input for receiving the digital video signal, a write address input coupled to an output of said determining means, and a read address input coupled to an output of said generating means, said DPRAM acting as a frame buffer for said digital video signal.

5. A method for correcting convergence and geometry errors in display devices comprising the steps:
   receiving a digital video signal;
   determining write addresses corresponding to an intended horizontal and a vertical location for each pixel in said digital video signal;
   generating read addresses corresponding to actual horizontal and vertical locations in a displayed image, said actual horizontal and vertical locations being based on a particular display device; and
   storing the pixels in the digital video signal at said write addresses, and outputting said pixels at an appropriate time as determined by said read addresses, whereby errors between said intended and actual locations are corrected.

6. The method for correcting convergence and geometry errors in display devices as claimed in claim 5, wherein said generating step comprises the steps:
   forming a displayed image having geometry errors on said display device;
   generating data corresponding to locations in said displayed image; and
   generating said address data for storage in said ROM based on said location data.

7. An apparatus for convergence and geometry errors in display devices, comprising:
   an input for receiving a digital video signal;
   means for determining write addresses corresponding to an intended horizontal and a vertical location for each pixel in said digital video signal, said means for determining further comprising: means for generating horizontal and vertical synchronizing signals; means for generating a pixel clock signal using said horizontal and vertical synchronizing signals; a pixel counter for counting the pixel clock signal, said pixel clock counter being reset by said horizontal synchronizing signal; and a line counter for counting the lines of the horizontal synchronizing signal, said line counter being reset by said vertical synchronizing signal, wherein an output from the pixel counter forms the horizontal portion of the write address of the pixels of the digital video signal, and an output from the line counter forms the vertical portion of the write address of the pixels of the video signal;

means for generating read addresses corresponding to actual horizontal and vertical locations in a displayed image, said actual horizontal and vertical locations being based on a particular display device; and means coupled to said input, said determining means and said generating means for storing the pixels in the digital video signal at said write addresses from said determining means, and for outputting said pixels at an appropriate time as determined by said read addresses from said generating means, whereby excess errors between said intended and actual addresses are corrected.

8. A method for correcting convergence and geometry errors in display devices, comprising the steps of:

receiving a digital video signal;

determining write addresses corresponding to an intended horizontal and a vertical location for each pixel in said digital video signal, wherein said determining further comprises the steps of: generating horizontal and vertical synchronizing signals; generating a pixel clock signal using said horizontal and said vertical synchronizing signals; counting the pixel clock signal to form a pixel count value, said pixel count value being reset by said horizontal synchronizing signal; and counting the lines of the horizontal synchronizing signal to form a line count value, said line count value being reset by said vertical synchronizing signal, wherein said pixel count value forms a horizontal portion of the write address of the pixels in the digital video signal, and said line count value forms a vertical portion of the write address of the pixels in the digital video signal;

generating read addresses corresponding to actual horizontal and vertical locations in a displayed image, said actual horizontal and vertical locations being based on a particular display device; and storing the pixels in the digital video signal at said write addresses, and outputting said pixels at an appropriate time as determined by said read addresses, whereby errors between said intended and actual locations are corrected.

* * * * *